H. L. JONES.
SLEIGH ATTACHMENT FOR VEHICLES.
APPLICATION FILED APR. 18, 1911.
1,002,916.
Patented Sept. 12, 1911.
2 SHEETS—SHEET 2.
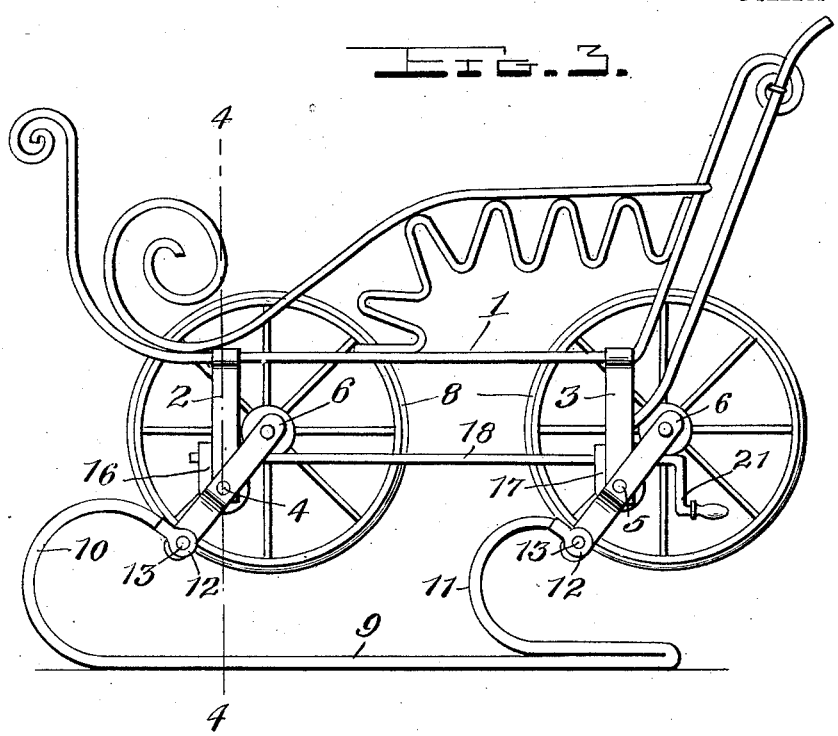
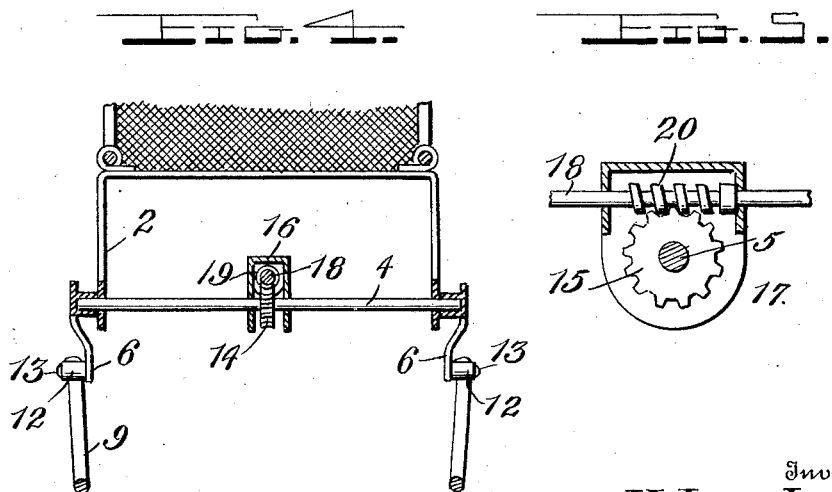
Witnesses
Chas. L. Griesbauer.
L. G. Ellis.
Inventor
H. Lee Jones.
By Watson E. Coleman,
Attorney

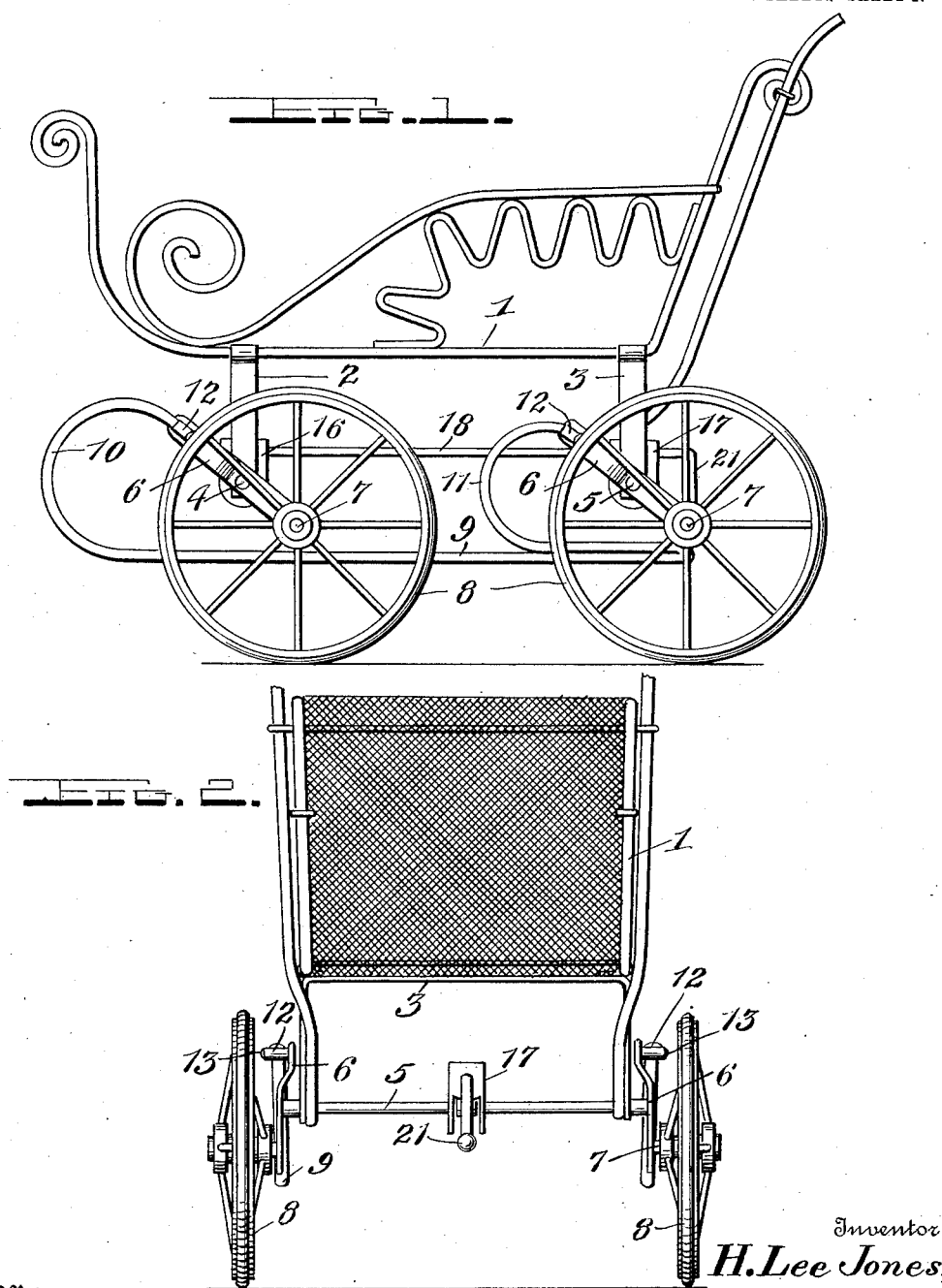

UNITED STATES PATENT OFFICE.

HENRY LEE JONES, OF LEADVILLE, COLORADO.

SLEIGH ATTACHMENT FOR VEHICLES.

1,002,916.  Specification of Letters Patent. Patented Sept. 12, 1911.

Application filed April 18, 1911. Serial No. 621,851.

*To all whom it may concern:*

Be it known that I, HENRY LEE JONES, a citizen of the United States, residing at Leadville, in the county of Lake and State of Colorado, have invented certain new and useful Improvements in Sleigh Attachments for Vehicles, of which the following is a specification, reference being had to the accompanying drawings.

My invention relates to new and useful improvements in vehicle attachments and more particularly to a sleigh attachment for vehicles of all types, and my object is to provide a device of this character which may be permanently carried on the vehicle and thrown into and out of effective position at will.

A further object of the invention resides in providing axles for the vehicle with crank arms which carry the wheel spindles and have also pivotally engaged therewith the ends of the sleigh runners.

A further object of the invention resides in providing means to rotate said axles to, respectively, raise or lower the sleigh runners.

A still further object resides in providing a device which is simple in construction, readily applied to use and one which is extremely effective in operation.

With these and other objects in view, my invention consists in the novel features of construction, combination and arrangement of parts as will be hereinafter referred to and more particularly pointed out in the specification and claims.

In the accompanying drawings forming a part of this application, Figure 1 is a side elevation showing my improved invention applied to a baby carriage and showing the runners in their raised positions. Fig. 2 is an end elevation of the same. Fig. 3 is a side elevation showing the runners in their lowered positions. Fig. 4 is a transverse section as seen on line 4—4, Fig. 3, and, Fig. 5 is a section through the casing on the rear axle showing the worm and gear engaged therewith.

In carrying out my invention, I shall refer to the drawings in which similar reference characters designate corresponding parts throughout the several views and in which—

1 indicates the body or bed of a vehicle of any type, here shown particularly as a baby carriage, said body having secured thereto, the front and rear supporting members 2 and 3 which, respectively, carry the front and rear axles 4 and 5. These axles are rotatably mounted in the supporting members and have rigidly mounted on the ends thereof beyond said supporting members, the crank arms or the like 6, said crank arms carrying at one of the ends thereof, the spindles 7, upon which are rotatably mounted the wheels 8.

A pair of runners 9 has the front and rear ends thereof curved, as shown at 10 and 11, and the extreme ends of said curved portions are provided with sockets 12 which pivotally receive therethrough, the stems 13 carried on the opposite ends of said crank arms. The stems 13 are disposed on the same side of the arms 6 as the spindles 7, but said stems are shorter in length, thereby disposing said runners between the vehicle frame and the wheels 8, and it will be seen that any rotation of the axles 4 and 5 will correspondingly rotate the crank arms and either lower the wheels and raise the runners, or vice versa, according to the direction in which said axles are rotated. I have provided, however, particular means for the rotation of these axles conjunctively, and to this extent, the gears 14 and 15 are rigidly mounted, respectively, on the front and rear axles 4 and 5, and loosely mounted on said axles, are the casings 16 and 17, respectively, which partially inclose said gears 14 and 15. These casings 16 and 17 receive therethrough and retain in position a shaft 18 extending longitudinally of the vehicle, said shaft being provided with the worms 19 and 20 adjacent the ends thereof which mesh with the gears 14 and 15, respectively, and the rear end of said shaft has formed thereon, a crank or handle member 21, whereby the same may be readily turned. By turning this handle member 21, the axles will be simultaneously rotated to lower or raise the runners, as desired.

In the drawings, I have shown my improved device applied to a baby carriage, to which the same is extremely well adapted, but it will be understood that this invention is equally as well adapted for use upon wagons and carriages of all types.

Although this sleigh attachment is adapted for use during snowy seasons, the same may be used to perform another important function during other seasons of the year, and to this extent, the runners may be used as brakes. Most baby carriages are provided with some form of brake, but with my improved device applied to use, it will be seen that it is only necessary to lower the runners so that the same engage the ground and the function of the brake will be performed. Of course, when used upon vehicles of larger and heavier types, the parts will be made stronger and an additional means may be provided so that the weight within the vehicle will not cause the longitudinal shaft to be casually rotated. Furthermore, various other changes in form, proportion and in minor details of construction may be resorted to without departing from the principle or sacrificing any of the advantages of the invention.

From the foregoing, it will be seen that I have provided a simple attachment for use on wheel vehicles, whereby the same will be readily adapted for use when snow is on the ground, and it will further be seen that I have provided a sleigh attachment which may be readily and quickly lowered for use. It will still further be seen that by providing axles which rotate in supporting members and providing the axles with crank arms, which crank arms have pivotal connection with the runners and carry the wheel spindles, the mere rotation of the axles in one direction or the other, will raise or lower the wheels and runners accordingly. Furthermore, it will be seen that the device is of such simple construction as to be easily and cheaply manufactured and one which is extremely effective in operation.

Although I have above stated that the crank 21 is disposed at the rear end of the vehicle, it will be readily understood that the same may be disposed in the front, side or rear, as may be convenient, when the device is either used in connection with a baby carriage or other larger vehicles and, in fact, two cranks may be used, one for the front and one for the rear end of the vehicles, if desired. I have also mentioned that this sleigh attachment is permanently carried on the vehicle, and to this extent, I refer to the operating parts, that is, when the device is used in connection with the wheels, the runners proper are not necessary and may be removed and vice versa. In this manner, the disuse of one will not be an obstacle to the use of the other.

What I claim is:—

1. In a vehicle sleigh attachment, the combination with a vehicle body and a pair of axles rotatably supported therebelow; of arms rigidly mounted on the ends of said axles and having spindles adjacent one of the ends thereof, wheels rotatably mounted on said spindles, runners carried by said arms, and means to rotate said axles to correspondingly raise or lower said runners and wheels.

2. In a vehicle sleigh attachment, the combination with a vehicle body, and a pair of axles rotatably supported therebelow, arms rigidly mounted on the ends of said axles, spindles carried adjacent one of the ends of said arms, a pair of runners having the ends thereof pivotally engaged with the opposite ends of said arms, and means to rotate said axles simultaneously to correspondingly raise and lower said wheels and runners.

3. In a vehicle sleigh attachment, the combination with a vehicle body and a pair of axles rotatably supported therebelow; of arms rigidly mounted on the ends of said axles, said arms being provided at one of their ends with spindles, wheels mounted on said spindles, said arms being provided adjacent their opposite ends with laterally disposed stems, a pair of runners provided with sockets at their ends pivotally engaged with said stems, and means to rotate said axles to correspondingly raise or lower said wheels or runners.

4. In a device of the character described, the combination with a vehicle body and axles rotatably supported therebelow; of arms rigidly mounted on the ends of said axles, wheels rotatably mounted adjacent one of the ends of said arms, a pair of runners having the ends thereof pivotally engaged adjacent the opposite ends of said arms, a gear mounted on each of said axles, a longitudinal shaft having worms mounted thereon in mesh with said gears, and means to rotate said shaft, whereby said wheels or runners may be lowered into engagement with the ground.

In testimony whereof I hereunto affix my signature in the presence of two witnesses.

HENRY LEE JONES.

Witnesses:
H. D. LEONARD,
W. G. HARRINGTON.

---

Copies of this patent may be obtained for five cents each, by addressing the "Commissioner of Patents, Washington, D. C."